UNITED STATES PATENT OFFICE.

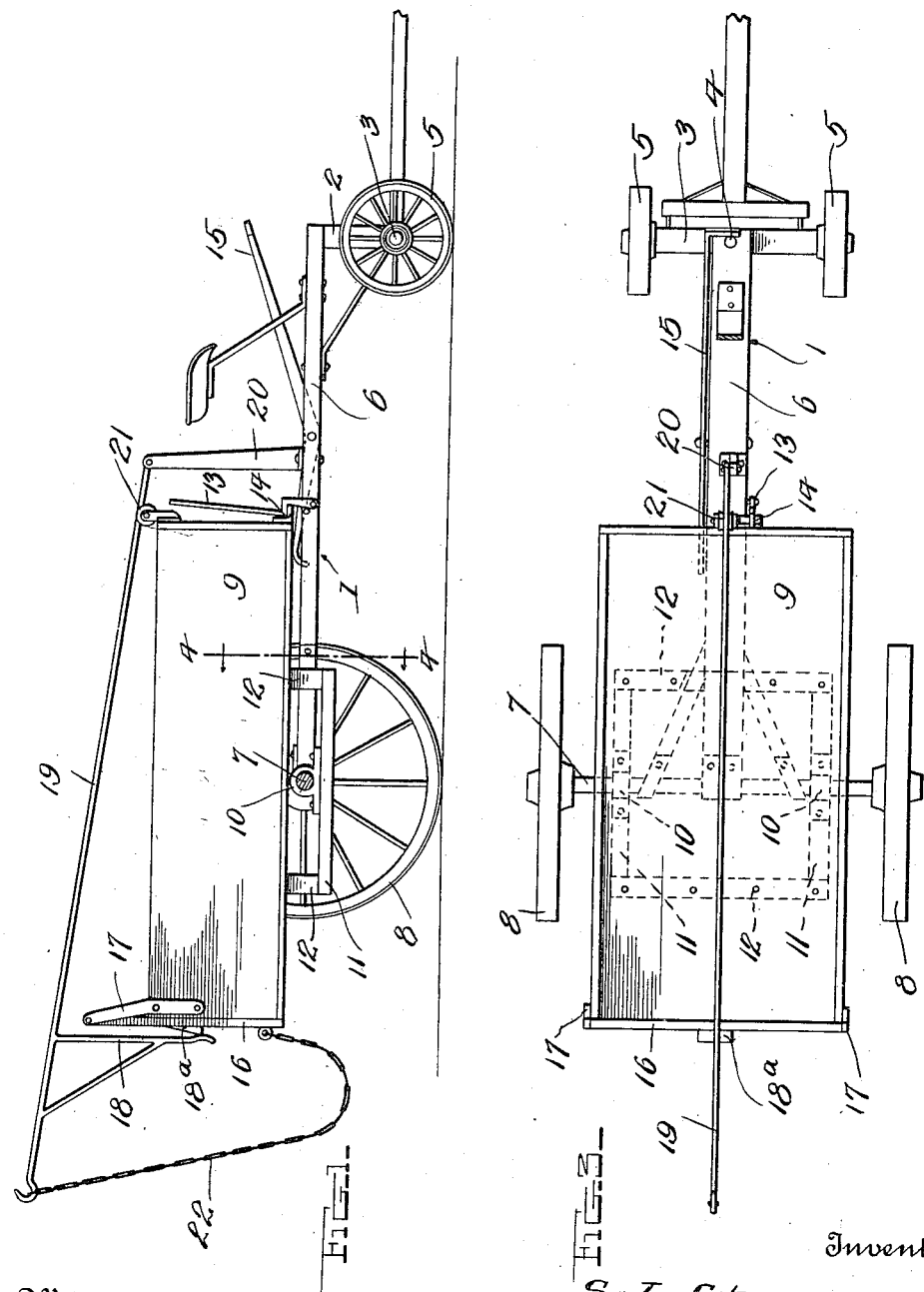

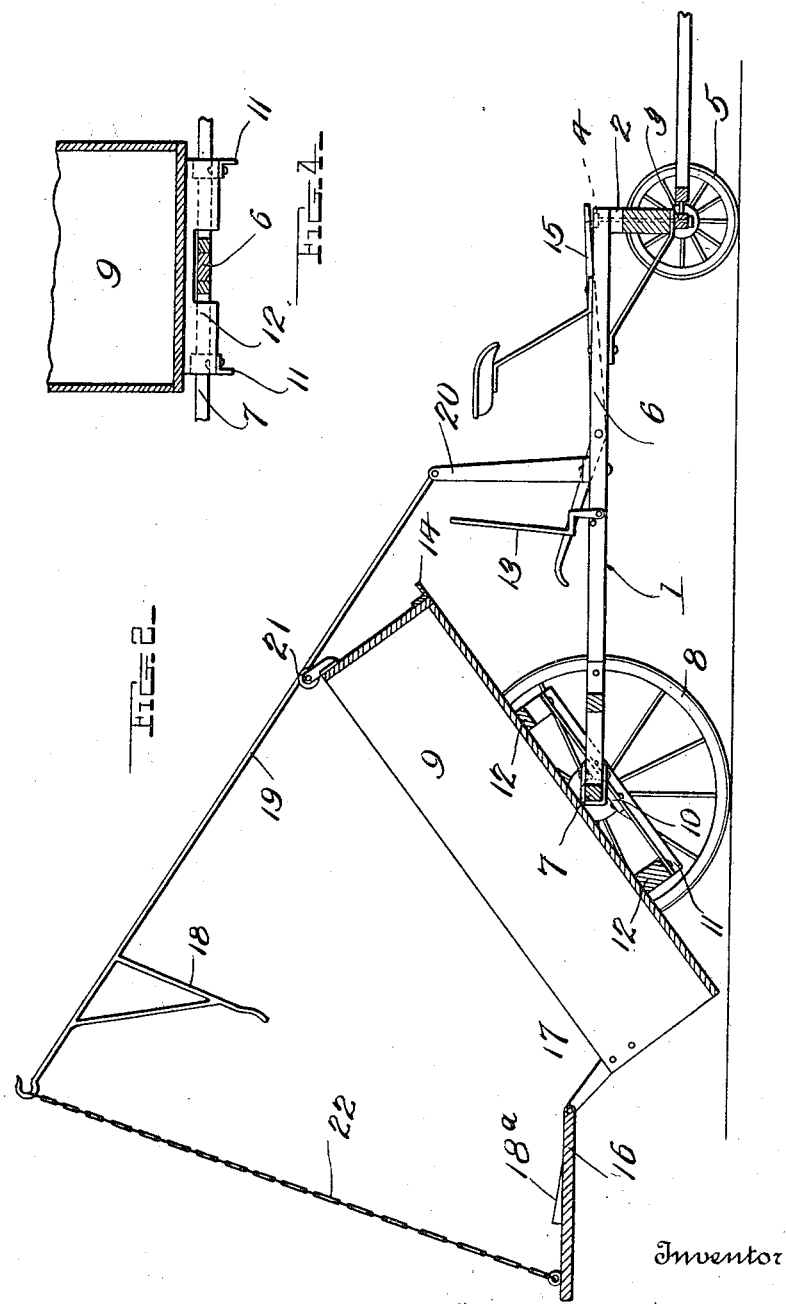

SAMUEL LUTHER STARNER, OF BUCYRUS, OHIO.

DUMP-WAGON.

1,210,867.  Specification of Letters Patent.  Patented Jan. 2, 1917.

Application filed June 19, 1916. Serial No. 104,595.

*To all whom it may concern:*

Be it known that I, SAMUEL LUTHER STARNER, a citizen of the United States, residing at Bucyrus, in the county of Crawford and State of Ohio, have invented certain new and useful Improvements in Dump-Wagons; and I do declare the following to be a full, clear, and exact description of the invention, such as will enable others skilled in the art to which it appertains to make and use the same.

My invention which relates to improvements in dump wagons has for its object to provide a light and simply constructed carrier of this class which may be inexpensively manufactured and marketed, yet will be highly efficient and durable.

With this general object in view, the invention resides in certain novel features of construction, and in unique combinations of parts to be hereinafter fully described and claimed, the descriptive matter being supplemented by the accompanying drawings which constitute a part of this application and in which:

Figure 1 is a side elevation of the improved wagon with the body thereof in operative position; Fig. 2 is a longitudinal section with the body tilted to discharge its load; Fig. 3 is a top plan view; and Fig. 4 is a detail transverse section on the plane of the line 4—4 of Fig. 1.

In specifically describing the structure shown in the drawings above briefly described, similar characters will be employed to designate corresponding parts throughout the several views and reference will be herein made to the numerous elements by their respective indices. To this end the numeral 1 designates broadly the running gear of the improved wagon, said gear comprising a front bolster 2, front axle 3 connected with said bolster by a king pin 4 and carrying front wheels 5, a reach 6 extending rearwardly from the bolster 2 and secured in any suitable manner to a rear axle 7 which carries wheels 8 on its ends. This running gear is shown for illustrative purposes only and it is to be understood that any other preferred construction may be employed.

A wagon body 9 is supported by the running gear 1, the axle 7 being disposed slightly in the rear of the center of said body, the two being held in this relation by bearings 10 secured in any manner to the wagon body. For illustrative purposes, the bearings 10 are shown as secured to a pair of longitudinally disposed angle metal bars 11 whose ends are anchored to sleepers 12 extending beneath the bottom of the body 9. A catch lever 13 normally coöperates with a stop 14 on the front end of the body to hold the latter in operative position, but when it is required to tilt said body rearwardly to discharge its load, the lever 13 may be released, and for initially tilting said body, a foot lever 15 is preferably fulcrumed to the reach 6 with its rear end disposed beneath the front end of said body. It will thus be evident that as the front end of the lever 15 is depressed, the body 9 will be started on its tilting movement.

A tail gate 16 is hinged at its upper edge to a pair of brackets 17 which rise from the sides of the body 9. A stop arm 18 bears normally against an inclined cam 18$^a$ secured to the rear side of the gate 16 to prevent opening of the latter until said arm is raised. Arm 18 is rigidly secured to and depends from a lever 19 which extends longitudinally above the body, the front end of said lever being fulcrumed to a standard 20 which rises rigidly from the reach 6 immediately in advance of the body. The front end of said body has thereon a shoe 21 preferably in the form of a roller, said shoe underlying the lever 19 whereby as the front end of the body 9 rises in tilting, the shoe 21 will raise the lever 19 to move the arm 18 free of the cam 18$^a$ and the gate 16. This leaves the tail gate 16 free to open.

Lever 19 preferably extends rearwardly beyond its arm 18 and the extreme rear end of said lever is connected by a chain or the like 22 with the lower edge of gate 16, said chain serving to open said gate when the lever 19 is forced upwardly when dumping. When, however, the body is returned to normal position, the lever 19 will again lower to engage its arm 18 with the cam 18$^a$ to effectively hold the gate 16 closed.

In operation the wagon will be loaded and drawn to the place at which its contents are to be dumped, whereupon the catch lever 13 is released by the driver, and if the load is not distributed so as to immediately tilt the body 9, the operator will facilitate this operation by depressing the foot lever 15. As the body now tilts, the shoe 21 raises the lever 19 and thus disengages the arm 18 from the cam 18$^a$. Further upward movement of said lever opens the gate 16 through the instrumentality of the chain 22 whereupon the load will be discharged, and due to the fact that the bearings 10 are located in rear of the center of the body 9, the latter will return to its normal position as will also the other working parts.

From the foregoing description taken in connection with the accompanying drawings, the construction, manner of operation and advantages of the improved wagon will be readily understood, but in conclusion, I will state that although certain specific details have been shown and described for illustrative purposes, numerous changes may be made within the scope of the invention as claimed without sacrificing the main advantages thereof.

I claim:

1. A dump wagon comprising a running gear, a body mounted thereon to tilt downwardly at its rear end, a tail gate hinged at its upper edge to said body, a vertically moving lever extending longitudinally of said body and having a stop arm engaging the rear side of said tail gate to hold the same in closed position, and means for raising said lever when the body is tilted, thereby moving said stop arm clear of the tail gate to permit opening of the latter.

2. A dump wagon comprising a running gear, a body mounted thereon to tilt downwardly at its rear end, a tail gate hinged at its upper edge to said body and having a downwardly and rearwardly inclined cam on its rear side, an upwardly moving lever extending longitudinally of the body and having a stop arm engaging said cam to hold the tail gate in closed position, and means for raising said lever when the body is tilted, thereby moving said stop arm free of the cam and the gate to permit opening of the latter.

3. A dump wagon comprising a running gear, a body mounted thereon to tilt downwardly at its rear and upwardly at its front end, a tail gate hinged at its upper edge to said body, a rigid standard rising from the running gear in advance of said body, a lever extending longitudinally above the body and fulcrumed at its front end to said standard, a stop arm depending rigidly from said lever in rear of the tail gate to normally prevent opening of the latter, and a shoe on the front end of the body underlying the lever to raise the latter when said body is tilted, thus moving the stop arm free of the gate to permit opening of the latter.

4. A dump wagon comprising a running gear, a body mounted thereon to tilt downwardly at its rear end, a tail gate hinged at its upper edge to said body, a vertically moving lever extending longitudinally above the body and having a depending stop arm in rear of the gate to normally prevent opening of the latter, means for raising said lever when the body is tilted, and a flexible connection between the lower edge of the tail gate and the rear end of the lever for opening said tail gate when said lever is raised.

5. A dump wagon comprising a running gear, a body mounted thereon to tilt downwardly at its rear end, a tail gate for said rear end of the body, a vertically moving lever extending longitudinally of said body and having a stop arm engaging the rear side of said tail gate to hold the same in operative position, and means for raising said lever when the body is tilted, thereby moving said arm clear of the tail gate to permit opening of the latter.

6. A dump wagon comprising a running gear, a body mounted thereon to tilt downwardly at its rear and upwardly at its front end, a tail gate for said rear end of the body, a vertically moving lever fulcrumed at its front end and extending longitudinally above said body, means releasable by movement of said lever for normally preventing opening of the tail gate, and a shoe on the front end of the body underlying the lever to raise the latter when said body is tilted, thus releasing the aforesaid means to permit opening of the tail gate.

In testimony whereof I have hereunto set my hand in the presence of two subscribing witnesses.

SAMUEL LUTHER STARNER.

Witnesses:
W. H. SHECKLER,
B. F. CAMPBELL.